Nov. 13, 1956     J. A. RUSSELL     2,770,062
WEIGHTED LURE RETRIEVER
Filed June 20, 1956
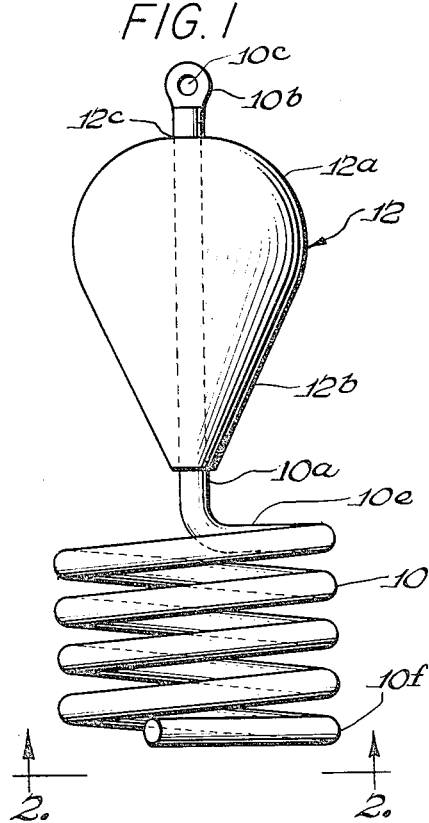
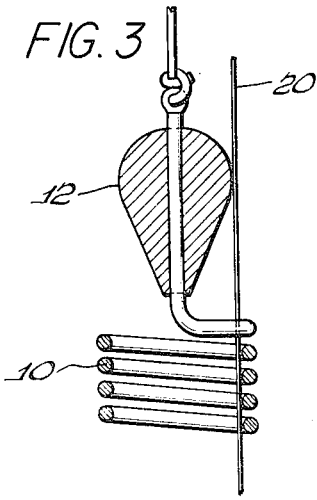
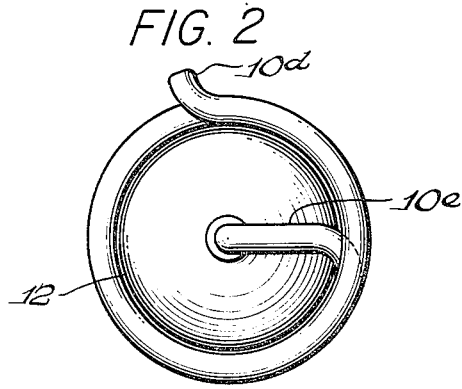
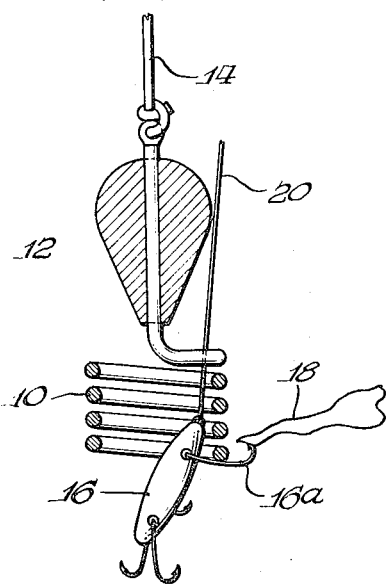
INVENTOR.
JOHN A. RUSSELL
BY George E. Frost
ATTORNEY United States Patent Office 2,770,062
Patented Nov. 13, 1956

2,770,062
WEIGHTED LURE RETRIEVER
John A. Russell, Chicago, Ill.
Application January 20, 1956, Serial No. 560,415
4 Claims. (Cl. 43—17.2)

My invention relates to an improved fishing lure retriever.

It is a common experience for a fisherman to get a lure snagged on some underwater object. Generally, jerking the fishing line to free the lure will only serve to imbed the hook of the lure more securely into the object. If an attempt is made to free the lure in this manner the fishing line is likely to snap and an expensive lure will be lost.

In the present invention, a lure retriever is provided which will operate to dislodge the snagged hook from the object and will free the lure without the risk of snapping the fishing line. In brief, the lure retriever of the present invention has a helical spring coil with spaced turns, all turns having approximately the same diameter. At the upper end, the helical spring coil has an axial extension or upstanding portion which carries a streamline weight. The weight is spaced from the helical coil and is aligned so that it meets the least resistance when traveling in the direction toward the helical coil. The streamline contour of the weight, at its widest diameter, is narrower than the diameter of the coil. The weight has a pull cord attached at the end opposite the coil.

In use, the lure retriever is threaded on a fishing line which has a snagged lure. After threading, the fishing line lies inside the helical spring coil. The lure retriever is lowered by its own pull cord and is guided in its descent by the fishing line. The lure retriever passes over the lure and the lower turn of the coil contacts the snagged hook of the lure. The lure retriever is then bounced on the hook until, by virtue of the repeated bouncing impact of the weighted lure retriever under the action of the spring, the hook is dislodged from the obstacle with which it is snagged. The bouncing of the lure retriever of the present invention is particularly effective in dislodging a hook because the weight, which is of streamline contour, and the construction which permits the free sliding action on the taut fishing line, make possible a solid, positive impact of the lure retriever on the snagged hook.

After the hook of the lure has been dislodged and the lure retriever and lure are brought to the surface, the lure retriever can be readily disengaged from the lure by pulling the latter up through the helical coil and out of the upper turn of the coil.

It is therefore a general object of the present invention to provide a lure retriever which may be bounced on the snagged hook of the lure to dislodge it from the object with which it is snagged.

It is another object of the present invention to provide a weighted lure retriever which is guided by the fishing line and will dislodge the snagged lure by the impact of its weight.

It is still another object of the present invention to provide a lure retriever having a streamlined weight to provide a sharp impact to dislodge a snagged lure.

It is a further object of the present invention to provide a lure retriever through which a lure can readily pass to provide for quick disengagement of the lure and the lure retriever without rethreading.

It is yet another object of the present invention to provide a weighted lure retriever through which a taut fishing line may freely pass.

It is still another object of the present invention to provide a simple lure retriever having no moving parts, having no sharp edges, easy to manufacture, and effective in operation.

The novel features which I believe to be characteristic of my invention are set forth with particularity in the appended claims. My invention itself, however, both as to its organization and method of operation, together with further objects and advantages thereof, will best be understood by reference to the following description taken in conjunction with the accompanying drawings in which:

Figure 1 is a view in elevation of the lure retriever of the present invention;

Figure 2 is a view through section 2—2 of Figure 1;

Figure 3 is an elevational view, partly in cross section, showing the lure retriever being lowered on a taut fishing line; and Figure 4 is an elevational view, partly in cross section, showing the lure retriever in engagement with the snagged hook of a lure.

The lure retriever of the present invention is shown in Figure 1. A helical spring coil 10, which may be made of steel rod, has a plurality of turns, each turn being spaced from the adjacent turn. All the turns have approximately the same diameter. The lower turn 10f of the helical spring coil has its end 10d curved radially outward as shown in Figure 2. The upper turn 10e of the helical coil is curved inwardly along the radius to the center of the turn which falls on the longitudinal axis of the coil as shown in Figure 2. At the axis of the helical coil the rod is bent at right angles to form an axial extension or upstanding portion 10a, as shown in Figure 1. The axial extension, at its upper end, has a flat head 10b which has a centrally disposed hole 10c to define an eye.

A streamline pear-shaped weight 12, preferably made of lead or cast iron, is carried on the axial extension 10a as shown in Figure 1. The weight has a rounded end 12a and a tapered end 12b and has its largest diameter, and hence the largest dimension in the direction normal to the axis of the coil, at the plane where the rounded end 12a and the tapered end 12b are joined. The weight has an axial hole 12c through which the axial extension 10a of the helical coil 10 passes. The largest diameter of the weight 12 is smaller than the inner diameter of the helical coil 10. The weight is spaced from the upper turn 10e of the helical coil and is aligned so that the tapered end 12b faces the coil as shown in Figure 1. A pull cord 14 is received in the hole 10c and secured to the axial extension 10a as shown in Figure 3.

If a hook 16a of the lure 16 becomes snagged on some underwater object 18, the fishing line 20 attached to the lure 16 is pulled taut. The fisherman then threads the lure retriever on the fishing line. This is done by engaging the fishing line 20 inside the outwardly turned end 10d of the lower turn 10f of the helical coil. The lure retriever is then turned in a clock-wise direction, when viewed from the top, to thread the helical coil on the fishing line. After the fishing line 20 is inside all of the turns of the helical coil 10, the lure retriever is lowered by cord 14 on fishing line 20 as shown in Figure 3. At this time the fisherman holds the fishing line 20 taut with one hand while he lowers the cord 14 with the other hand. It will be noted that since the largest diameter of the streamline weight is smaller than the inner diameter of the helical coil the lure retriever freely rides on the taut fishing line 20. Since the fishing line when straight can pass through the lure retriever without binding contact with the weight or coil, the lure retriever can freely slide on the fishing line regardless of how taut the line is held.

The lure retriever is lowered until it engages the snagged lure. The helical spring coil 10 of the retriever will pass over and envelop the lure 16 and the lower turn 10f of the helical coil will engage the snagged hook 16a as shown in Figure 4. At this time the cord 14 can be repeatedly jerked by the fisherman to bounce the lower turn 10f on the snagged hook 16a. It is possible to impart a solid sharp blow to the hook 16a because of the streamline weight 12 carried by the lure retriever and the free sliding characteristic of the lure retriever on the taut fishing line.

After the lure 16 has been released, the lure can readily be disengaged from the lure retriever. This can be done merely by pulling the lure up through the helical coil 10 and out the upper turn 10e of the coil. This is possible because the coil 10 has a generally cylindrical shape and because the weight 12 is spaced from the upper end of the coil. In the event that an unusually large lure is used, it is, of course, possible to unwind the helical coil 10 from the fishing line 20.

Thus a lure retriever is provided which is easy to manufacture, has no moving parts, and which has no sharp edges which could possible damage the fishing line. At the same time, the lure retriever is extremely effective in operation because of its free movement in relation to the taut fishing line which passes through the coil and because of the streamline weight spaced from one end of the coil. This weight provides a solid impact when the coil contacts a snagged hook and is effective in dislodging even the most securely snagged hook.

The lure retriever of the present invention can be readily engaged with the fishing line, even though the fishing line is snagged at one end, without the necessity of breaking the fishing line. In operation, the lure retriever is aligned with the axis of the helical coil 10 in the vertical direction and the retriever depends from the end of the cord 14. The retriever can be lowered, without binding on the fishing line which passes vertically through the coil, to engagement with the snagged lure. The vertically oscillating bouncing action on the snagged hook 16a is facilitated by the spring action of the helical coil 10.

It should be noted that although a coil having turns of equal diameter is shown it is only necessary that each turn have a diameter larger than the largest dimension, normal to the axis of the coil, of the weight carried on the axis of the coil.

While I have shown and described a specific embodiment of the present invention, it will be understood that numerous modifications and alternative constructions may be made without departing from its true spirit and scope. I therefore intend by the appended claims to cover all such modifications and alternative constructions as fall within their true spirit and scope.

What I claim as new and desire to secure by Letters Patent of the United States is:

1. A retriever for a fishing lure on a line comprising in combination: a spring coil having an axis and being of diameter sufficient to pass the lure and having an axial upstanding portion of substantial length terminating in an eye adapted to receive a pull cord; a pear-shaped weight received on said upstanding portion of the coil and being so shaped and spaced in relation to the turns of the coil as to pass the lure, the largest diameter of the weight further being such that the line may pass vertically through the coil without interference from the weight, whereby the spring coil may be threaded through the line and lowered to engagement with the snagged lure, the retriever may be bounced on the lure to dislodge the same by repeated blows, and the lure may then by disengaged by passing the same through the coil.

2. A retriever for a fishing lure on a line comprising in combination: a spring coil having an axis and being of a diameter sufficient to pass the lure and having an axial upstanding portion of substantial length having means at one end to receive a pull cord; a weight received on the upstanding portion of the coil and being spaced in relation to the turns of the coil to pass the lure, the largest dimension of the weight normal to the axis of the coil further being such that the line may pass vertically through the coil without interference with the weight, whereby the spring coil may be threaded through the line and lowered to engagement with the snagged lure, the retriever may be bounced on the lure to dislodge the same by repeated blows, and the lure may then be disengaged by passing the same through the coil.

3. A retriever for a fishing lure on a line comprising in combination: a spring coil having an axis and an upstanding axially disposed portion; a weight received on said upstanding portion of the coil and having a diameter such that the line may pass vertically through the coil without interference from the weight; and said retriever further having means defining an eye at the top portion of the weight in axial position in relation to the coil to receive a pull cord, whereby the spring coil may be threaded through the line and the retriever lowered to engagement with the snagged lure and bounced on the lure to dislodge the same by repeated blows.

4. A retriever for a fishing lure on a line comprising in combination: a spring coil having an axis and an axial upstanding portion of substantial length terminating in an eye to receive a pull cord; a pear shaped weight received on the upstanding portion of the coil, the largest diameter of the weight being such that the line may pass vertically through the coil without interference from the weight, whereby the spring coil may be threaded through the line and lowered to engagement with the snagged lure, and the retriever may be bounced on the lure to dislodge the same by repeated blows.

No references cited.